US008957972B2

(12) United States Patent
Gluskin et al.

(10) Patent No.: US 8,957,972 B2
(45) Date of Patent: Feb. 17, 2015

(54) AUTOMATIC GLASS-TO-GLASS VIDEO AND A/V SYNC TEST TOOL

(71) Applicant: Avaya, Inc., Basking Ridge, NJ (US)

(72) Inventors: Dan Gluskin, Tel-Aviv (IL); Michael German, Modiin (IL); Itai Ephraim Zilbershtein, Hod-Hasharon (IL); Yosef Goldberg, Nechusha (IL); Michel Ivgi, Yehud (IL)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/899,182

(22) Filed: May 21, 2013

(65) Prior Publication Data

US 2014/0347499 A1  Nov. 27, 2014

(51) Int. Cl.
*H04N 17/00* (2006.01)
*H04N 17/02* (2006.01)
*H04N 5/44* (2011.01)
*H04N 9/475* (2006.01)
*H04N 5/60* (2006.01)
*H04N 17/04* (2006.01)

(52) U.S. Cl.
CPC ..................................... *H04N 17/04* (2013.01)
USPC ............ 348/192; 348/500; 348/518; 348/738

(58) Field of Classification Search
CPC ........ H04N 1/32; H04N 1/36; H04N 21/4307
USPC .......................................... 348/500, 518, 738
See application file for complete search history.

(56) References Cited

U.S. PATENT DOCUMENTS

| 6,507,370 | B1 * | 1/2003 | Franklin et al. ............... 348/540 |
| 7,496,040 | B2 | 2/2009 | Seo |
| 8,626,499 | B2 * | 1/2014 | Yellamraju et al. ........... 704/224 |
| 2003/0142201 | A1 * | 7/2003 | Babka et al. ............... 348/14.09 |
| 2011/0018959 | A1 | 1/2011 | Friel et al. |
| 2012/0054567 | A1 * | 3/2012 | Valakh et al. ................ 714/724 |
| 2012/0287288 | A1 * | 11/2012 | Steinberg et al. ............. 348/181 |

OTHER PUBLICATIONS

Boyaci, Omer et al.; 2009 11th IEEE International Symposium on Multimedia; "vDelay: A Tool to Measure Capture-to-Display Latency and Frame Rate"; Dec. 14, 2009; IEEE/Columbia University; pp. 194-200; accessed at http://www.cs.columbia.edu/~boyaci/papers/vdelay.pdf; first accessed Jan. 18, 2013; date of paper found at http://ieeexplore.ieee.org/xpl/mostRecentIssue.jsp?punumber=5362508.

* cited by examiner

*Primary Examiner* — Jefferey Harold
*Assistant Examiner* — Michael Teitelbaum
(74) *Attorney, Agent, or Firm* — Cochran Freund & Young LLC

(57) ABSTRACT

Disclosed is a method and tool that performs glass-to-glass testing of a test AV system. The test AV system may be a transmitter device that senses AV stimuli and transmits an AV signal to a receiver device that displays video and provides an audio out/speaker of the audio. A light source and a sound source may be placed at the transmitter device. A light sensor and microphone/direct audio out connection may be placed at the receiver device. The automatic test tool may cycle synchronized light/sound stimuli to the transmitter device and measure the delay/latency times for audio, video, and AV synchronization at the receiver device. The automatic test tool may be comprised of a computer running user interface/test management software connected to a low cost FPGA that controls the video/sound sources and sensors to accurately measure both video and audio glass-to-glass latency/synchronization in a continuous, automatic, and self-calibrating manner.

16 Claims, 7 Drawing Sheets

AUTOMATIC GLASS-TO-GLASS VIDEO AND A/V SYNC TEST TOOL

BACKGROUND OF THE INVENTION

As technology has progressed, the use of real-time video and audio applications to perform video conferencing (sometimes also called video chatting) over long distances has become more prevalent. To support video conferencing, each location in the video conference has a transceiver device that acts as both a transmitter and receiver for exchanging data. Each transceiver device will also typically have the ability to capture video and audio as well as to reproduce/playback video and audio captured at a different location and transmitted electronically to the local location. To perform video and audio capture, a typical device might use a camera/webcam for the video and microphone for the audio. To reproduce/playback the video, a device will typically have or connect to some type of video display. To reproduce/playback the audio, a device will typically have a speaker or an audio out connector to connect to a remote speaker or headset. Thus, each transceiver is able to capture the local Audio/Video (AV) stimuli, convert to electronic form and transmit to a remote location, while at the same time receiving an AV signal from a remote location and reproducing the AV signal into audio and video reproduced/played back for the local user.

SUMMARY OF THE INVENTION

An embodiment of the present invention may comprise a method to automatically perform glass-to-glass operational testing of a test Audio/Video (AV) system comprising: preparing the test AV system for AV communication operation by operably connecting an AV transmitter device located at a transmitter location to an AV receiver device located at a receiver location over an AV communication link such that the AV transmitter device detects AV stimuli data, converts the AV stimuli data to an appropriate communication format and transmits the AV stimuli detected at the transmitter location over the AV communication link to the AV receiver device that converts the AV stimuli data in the appropriate communication format received from the AV communication link to received audio and received video signals for playback on audio and video devices operably connected to the AV receiver device; placing a transmitter side light source device and a transmitter side sound source device at the transmitter location such that a video sensor of the AV transmitter device detects light stimuli from the transmitter side light source device and a sound sensor of the AV transmitter device detects sound stimuli emitted by the transmitter side sound source device; operably connecting the transmitter side light source device and the transmitter side sound source device at the transmitter location to a computerized automatic testing system; placing a receiver side light sensor at the receiver location such that the receiver side light sensor detects the light emitted from the transmitter side light source device reproduced on a video display of the AV receiver device in accord with the received video signal; operably connecting the computerized automatic testing system to the receiver side light sensor; operably connecting the computerized automatic testing system to an audio output of the AV receiver device; creating by the computerized automatic test tool a test audio signal and a test light signal such that the test audio signal and the test light signal are synchronized to each other; sending the test audio signal and the test light signal from the computerized automatic test tool to the transmitter side sound source device and the transmitter side light source device at a test start time such that the transmitter side sound sensor device and the transmitter side video sensor device detect synchronized AV stimuli and transmit the synchronized AV stimuli data to the AV receiver device; detecting by the computerized automatic test tool through the operably connected receiver side light sensor light produced by the transmitter side light source device reproduced on the video display of the AV receiver device in accord with the received video signal at a received video time; detecting by the computerized automatic test tool sound produced by the transmitter side sound source device reproduced in the received audio signal at a received audio time; calculating by the computerized automatic test tool at least one AV latency time based on the test start time, the detected received video time, and/or the detected received audio time; and reporting by the computerized automatic test tool the at least one AV latency time as a metric of the AV test system operation.

An embodiment of the present invention may further comprise an AV test apparatus for automatically performing glass-to-glass operational testing of a test Audio/Video (AV) system, the test AV system comprising an AV transmitter device located at a transmitter location operably connected to an AV receiver device located at a receiver location over an AV communication link such that the AV transmitter device detects AV stimuli data, converts the AV stimuli data to an appropriate communication format and transmits the AV stimuli detected at the transmitter location over the AV communication link to the AV receiver device that converts the AV stimuli data in the appropriate communication format received from the AV communication link to received audio and received video signals for playback on audio and video devices operably connected to the AV receiver device, comprising: a transmitter side light source device and a transmitter side sound source device placed at the transmitter location such that a video sensor of the AV transmitter device detects light stimuli from the transmitter side light source device and a sound sensor of the AV transmitter device detects sound stimuli emitted by the transmitter side sound source device; a receiver side light sensor placed at the receiver location such that the receiver side light sensor detects the light emitted from the transmitter side light source device reproduced on a video display of the AV receiver device in accord with the received video signal; and a computerized automatic test tool that is operably connected to the transmitter side light source device and the transmitter side sound source device at the transmitter location, to the receiver side light sensor, and to an audio output of the AV receiver device, the computerized automatic test tool having subsystems that create a test audio signal and a test light signal such that the test audio signal and the test light signal are synchronized to each other, send the test audio signal and the test light signal from the computerized automatic test tool to the transmitter side sound source device and the transmitter side light source device at a test start time such that the transmitter side sound sensor device and the transmitter side video sensor device detect synchronized AV stimuli and transmit the synchronized AV stimuli data to the AV receiver device, detect through the operably connected receiver side light sensor light produced by the transmitter side light source device reproduced on the video display of the AV receiver device in accord with the received video signal at a received video time, detect sound produced by the transmitter side sound source device reproduced in the received audio signal at a received audio time, calculate at least one AV latency time based on the test start time, the detected received video time, and/or the detected received audio time, and report the at least one AV latency time as a metric of the AV test system operation.

DETAILED DESCRIPTION OF THE EMBODIMENTS

Figure 1:
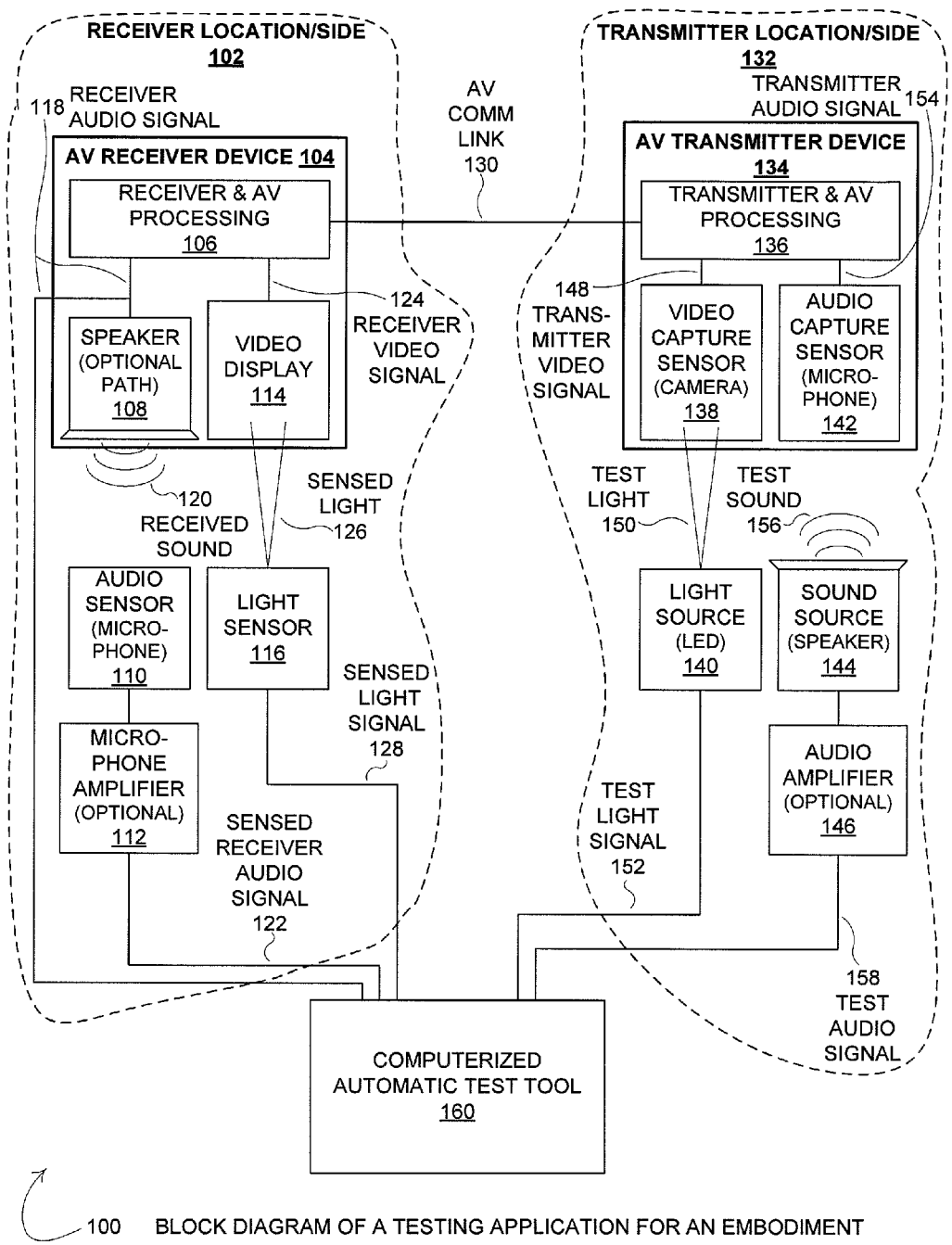
FIG. 1 is a block diagram of a glass-to-glass Audio/Video (AV) latency testing application for an embodiment.

With the move in the market place to video conferencing/chatting rather than just telephonic conversations (i.e., a purely audio connection) for long distance communication, it is desirable to have the Audio/Video (AV) representation be as close to a real life conversation as possible. As a result, having low audio/video latency (i.e., delay) plays a crucial role for interactive conversations so that there is not an awkward pause for speakers to wait for AV signals to travel between locations. Further, it is also important that the audio and video signals are properly synchronized so that the lip movement of the speaker on the video display matches the audio heard on the speakers/head phones. Conversation may suffer (i.e., the experience may become annoying to a user) when a one way delay (i.e., the signal travel time from one location to another location) is beyond 250 ms (milli-seconds). To permit some leeway (i.e., head room) to permit some network or other delay, it may be desirable to design video systems with a delay below 180 ms. This is not a trivial task. This same limitation may also apply to the audio portion of a system, but video signals contain significantly more data than audio, and, thus, tend to be the controlling factor in overall AV system operation. Video processing may be done at the frame level. For example, a video processing system using 30 frames per second (a typical real time video frame rate) may use 3 buffers at the receiving end/side and 2 buffers at the transmitting end/side resulting in an initial theoretical system delay of 167 ms (5 buffers/30 frames per second), which is almost the entire 180 ms delay budget. Hence, bugs in the system, software inefficiencies and/or other sources of delay (e.g., delay caused by processing time, Operating System—OS—scheduling, and/or Central Processing Unit—CPU—load) may easily cause the system delay/latency to exceed the 180 ms delay budget.

Accordingly, when developing video and audio systems, tools that are capable of automatically measuring video and audio delay over extended periods of testing to aid in the optimization of the overall AV system's latency/delay may be beneficial to AV system development. A bare bones AV system may include an AV transmitter device capturing a remote AV signal, sending the AV signal to an AV receiver device that reproduces the AV signal on displays and speakers to an AV receiver device user. The testing need may be three-fold in nature, including measuring: audio delay, video delay, and the relative difference between the audio and video delay while measured simultaneously (i.e., the AV sync delay) in order to verify that the AV sync delay deviation is within an acceptable range to provide acceptable lip-sync for the overall AV system. To properly test an AV system, it may be desirable to have a non-intrusive testing tool that does not interfere with the standard operation of the AV transmitter and AV receiver devices so that test measurements are truly "glass-to-glass" and "mouth-to-ear" delays/latencies. That is, it may be desirable for the test delay/latency measurements to be performed such that the AV transmitter/receiver devices operate independently of the test tool apparatus with the test tool apparatus measuring the delays/latencies as a function of the standard operation of the AV equipment. Further, it may also be desirable for the test tool apparatus to be fully automated to allow activation via a computer based test system, thus, permitting latency/delay testing to become part of regression testing for new software/firmware revisions of AV equipment.

FIG. 1 is a block diagram 100 of a glass-to-glass Audio/Video (AV) latency testing application for an embodiment. For the embodiment shown in FIG. 1, there is a system under test (i.e., the test AV system) comprised of AV receiver device 104 and AV transmitter device 134 connected by a communication link 130 capable of carrying the AV data signal from the AV transmitter device 134 to the AV receiver device 104. The testing system is generally comprised of a computerized automatic test tool 160 that manages, controls, and reports the results of testing operations. In addition to the computerized automatic test tool 160, the testing apparatus is further comprised of the audio 144 and video/light 140 source stimuli to provide to the AV transmitter device 134 and the audio sensor 110/signal 118 and light sensor 116 used to detect when the transmitter source stimuli 140, 144 is reproduced by the AV receiver device 104.

Generally, the delay/latency testing operation is independent of the standard operation of the AV receiver device 104 and/or the AV transmitter device 134 such that the AV receiver device 104 and the AV transmitter device 134 simply operate as the individual devices 104, 134 were intended to operate. The computerized automatic test tool 160, without changing operation of the AV transmitter 134 and receiver 104 devices, controls the AV source stimuli 140, 144 for the transmitter device 134 and reads sensor/signals 110, 116, 118 that interact with the AV transmitter 134 and receiver 104 devices using the standard AV capture 138, 142 and AV reproduction 108, 114, 118 subsystems of the AV transmitter 134 and receiver 104 devices. Thus, the testing is performed without effecting the standard operation of the AV transmitter 134 and receiver devices 104.

Typical AV transmitter 134 and receiver 104 devices will, in actuality, be capable of both acting as the AV transmitter 134 and the AV receiver 104 since the typical AV device being tested is an AV transceiver that is capable of capturing local audio and video stimuli, transmitting that information to another device and then receiving audio and video data from the other device describing the audio and video stimuli at the other device. Thus, during different phases of testing, the device used for the AV transmitter 134 and the device used for the AV receiver 104 may be switched to permit data flow in the opposite direction relative to the two test devices. That being said, all that is necessary for the AV receiver device is a subsystem 106 to receive and process the AV signal carried on AV communication link 130, and some means to reproduce the video (such as a video display 114) and audio (sent to an external speaker/head phones via audio signal 118 or reproduced by speaker 108). All that is necessary for the AV transmitter device is some means to capture video (such as a video capture sensor 138) and audio (such as audio capture/microphone 142), and a subsystem 136 to process and transmit the AV signal over the AV communication link 130. Thus, for the purposes of testing, the AV receiver device 104 does not necessarily need to have AV signal transmission, video capture, and/or audio capture capability and the AV transmitter device 134 does not necessarily need to have AV signal receiving, video display/reproduction, and/or audio reproduction capability, even if those features would typically be included in a device being tested.

While operation of the computerized automatic test tool is independent from the internal workings of the AV transmitter 134 and receiver 104 devices, it is worth understanding the basic operation of the device 104, 134 to better understand testing operations. For the AV receiver device 104, there are generally three subsystems, the AV receiver/signal processor 106, the receiver speaker 108/audio signal 118, and the video display 114. The receiver and AV processing occurs at subsystem 106 where the AV signal is received from the AV communication link 130 and AV processing in subsystem 106 creates a receiver audio signal 118 and a receiver video signal 124. The AV processing at subsystem 106 may also include any de-packetization, decoding, jitter buffering, and signal rendering for driving the receiver audio signal 118 and/or the receiver video signal 124. The receiver video signal 124 is typically sent to video display 114 built into the AV receiver device 104. In some embodiments, the AV receiver device 104 may have an external connection to a video display 114 permitting the changing of the video display 114 to suit the needs of a user. Whether the video display 114 is internal or external to the receiver device 104, the light sensor 116 observes and detects light changes in the same manner, by being configured to observe/be placed over the appropriate portion of the video display 114 reproducing the stimuli from light source 140. The receiver audio signal 118 may be connected directly to the computerized automatic test tool or the receiver audio signal 118 may be sent to a speaker 108 built into the AV receiver device 104 or external to the AV receiver device 104, where the sound made by the receiver speaker 108 is sensed via audio sensor/microphone 110 that sends a sensed receiver audio signal 122 to the computerized automatic test tool 160. The receiver audio signal 118 and the sensed receiver audio signal 122 are the same type of audio signal (albeit the sensed receiver audio signal 122 may potentially contain additional noise from external sources not included in the receiver audio signal 118) and, thus, may be connected using the same connection point on the computerized automatic test tool 160. One skilled in the art will understand that any video and sound reproduction systems/devices may be used for the video display 114 and audio speaker 108 of the AV receiver device 104.

For the AV transmitter device 134, there are also generally three subsystems, the AV signal processor/transmitter 136, the transmitter audio capture sensor (e.g., a microphone) 142, and the transmitter video capture sensor (e.g., a camera, digital camera, webcam, etc.) 138. The transmitter and AV processing occurs at subsystem 136 where the captured audio signal 154 and the captured video signal 148 are converted into an AV signal that is transmitted over AV communication link 130. The AV processing at subsystem 136 may also include any packetization, encoding, network transmittal processing, and/or signal processing for encapsulating the transmitter video 148 and audio 154 signals for transmittal on the AV communication link. One skilled in the art will recognize the AV communication link 130 may be any communication link capable of carrying an AV signal understood by both AV receiver device 104 and AV transmitter device 134. For example, the AV communication link 130 may be an Internet connection, or a private network connection using any of the potential networking technologies compatible with the Internet. Hence, the AV communication link may be an analog or digital communication protocol and may be physically implemented using wireless, wire, and/or optical (e.g., fiber optic cable) connections, or a combination of the various physical and networking interconnections. Since the computerized automatic test tool 160 simply provides AV stimuli at the transmitter side/location 132 and senses/detects the reproduction of AV stimuli at the receiver side/location 102, the type of AV communication link 130 is immaterial to the testing operation. The transmitter video capture sensor 138 typically sends a transmitter video signal 148 reflecting the sensed video/optical stimuli to the transmitter and AV processing subsystem 136 of the AV transmitter device 136. While a typical AV transmitter device 134 may have an internal video capture sensor 138, an external video capture sensor 138 may be used with the transmitter video signal 148 being sent to the transmitter and AV processing subsystem 136. Similarly, the transmitter audio capture sensor/microphone 142 typically sends a transmitter audio signal 154 reflecting the sensed audio/sound stimuli to the transmitter and AV processing subsystem 136 of the AV transmitter device 136. While a typical AV transmitter device 134 may have an internal audio capture sensor/microphone 142, an external audio capture sensor/microphone 142 may be used with the transmitter audio signal 154 being sent to the transmitter and AV processing subsystem 136. Whether the transmitter video 138 and audio 142 capture sensors are internal or external does not matter to the computerized automatic test tool 160 since the computerized automatic test tool measures delays/latencies on an end-to-end basis independent of the particular operation of the AV transmitter device 134, the AV receiver device 104, and/or the AV communication link 130.

The computerized automatic test tool is effectively located between the receiver side/location 102 and the transmitter side/location 132. When being used for a real world video conference/chat, the receiver location 102 and transmitter location are likely at least separate rooms in the same building at the closest and opposite sides of the world for long remote connections. For testing, the receiver location 102 and transmitter location may actually be in the same room, possibly even sitting on the same table. To simulate remote connections, the AV communication link 130 may route data from the AV transmitter device 134 to the Internet where the data may travel over many miles of wire/fiber optic cable before returning to the AV receiver device 104. In some testing scenarios, it may be desirable to minimize the potential latency/delay incurred due to the AV communication link 130, so there may be a very short direct wire connection from the AV transmitter device 134 to the AV receiver device 104 providing the AV communication link. If the AV receiver device 104 and the AV transmitter device 134 reside in the same room, and it is chosen to use a receiver side 102 speaker 108 and audio sensor/microphone 110 to provide the receiver side 102 audio signal 122 to computerized automatic test system 160, care must be taken to isolate the sound made by the transmitter side 132 sound source/speaker 144 and the sound detected/picked up by the receiver side 102 audio sensor/microphone 110. Whether the AV receiver device 104 and the AV transmitter device 134 reside in the same room, different rooms, or even more remote distances from each other, the computerized automatic test tool may be effectively located between the receiver location/side 102 and the transmitter location/side 132. For testing purposes, the distance the AV receiver device 104 may be separated from the AV transmitter device is the shortest of the maximum permissible distances that the sensed light signal 128 or the receiver audio signal 116/sensed receiver audio signal 122 may be placed away from the computerized automatic test tool 160 plus the shortest of the maximum permissible distances that the light source 140 or the sound source 144 may be placed away from the computerized automatic test tool. The maximum distance that the receiver side 102 sensors/audio signals 110, 116, 118 and the transmitter side light/sound sources 140, 144 may be placed from the computerized automatic test tool 160 will vary with the specific sensors/audio signal 110, 116, 118 and light/sound sources 140, 144 utilized. For instance, a Universal Serial Bus (USB) connection may be limited to tens of feet while some types of twisted pair communications may permit sending signals over several thousands of feet. If using a test system separated by long distances, proper consideration should be given for potential signal delays between the computerized automatic test tool 160 and the receiver side 102 sensors/audio signal 110, 116, 118 and the transmitter side 132 light/sound sources 140, 144 so that delays incurred in communicating to sources 140, 144 and from sensors 110, 116, 118 do not have a noticeable effect on the test delay/latency measurements.

The transmitter side 132 light source 140 should be located so that a test light 150 produced by the light source 140 is detectable by the video capture sensor 138 of the AV transmitter device 134. The light source 140 may be any light source detectable by the video capture sensor 138 and reproducible on the receiver side 101 video display 114, such as one or more Light Emitting Diodes (LEDs), an incandescent lamp, or any other light source. The transmitter side sound source/speaker 144 may be any device capable of making a test sound 156 detectable by the AV transmitter device 134 audio capture sensor/microphone 142. In some embodiments, there may need to be an optional audio amplifier 146 placed in line with the test audio signal 158 to properly drive the sound source/speaker 144.

The receiver side 102 light sensor 116 should be located so that the light sensor 116 senses light from the portion of the video display 114 of the AV receiver device 104 reproducing the test light stimuli from the transmitter side 132 light source 140. For some light sensors, this placement of the light sensor 116 may involve physically placing the light sensor over the appropriate area of the AV receiver device 104 video display 114. For other light sensors, there may be a targeting feature that permits the sensor to narrow the sensed light 126 to a particular area that is configurable within the light sensor 114. Still other light sensors may define where to sense light in another manner, but as long as the light sensor is able to effectively sense the light from the light source 140 reproduced on the video display 114, the light sensor should be acceptable. As long as a light sensor device is able to detect the change in light of the test light 150 reproduced on the receiver side 102 video display 114, the light sensor may be satisfactorily used for an embodiment. Accordingly, a standard light sensor, sometimes called an ambient light sensor, may be used. Further, even though more expensive and potentially more cumbersome, a camera/digital camera may be used as the light sensor 116 so long as the light intensity of the reproduction of the test light 150 on the video display 114 is satisfactorily isolated and detected.

The receiver side audio/sound signal 118, 122 may be obtained directly from an audio output of the received audio signal 118 on the AV receiver device 104 or through an audio sensor/microphone 110 placed so that the receiver side 102 audio sensor/microphone 112 detects the received sound 120 produced by the AV receiver device 104 speaker 108. As noted above, care should be taken to isolate the test sound 156 produced by the transmitter side sound source/speaker 144 from the received sound 120 reproduced by the AV receiver device 104 to ensure that testing is not skewed by the receiver side 102 audio sensor/microphone 110 and/or the transmitter side 132 audio capture sensor/microphone 142 inadvertently picking up sound produced by the opposite side of the test from where the microphone 110, 142 is located. Simply using the receiver audio signal 118 from a direct external speaker/head phone output jack of the AV receiver device 104 eliminates concern with receiver side 102 noise since the received audio signal 118 is used directly without first being transformed into a received sound 120 and then converted back to a sensed receiver audio signal 122. To ensure proper signal strength, an optional microphone amplifier 112 may be placed in the sensed receiver audio signal 122 line.

The computerized automatic test tool 160 has connections for the audio signal (either the direct receiver audio signal 118 or the sensed receiver audio signal depending on what path is chosen by the tester), the sensed light signal 128, the test light signal 152 to the light source 140, and the test audio signal 158 to the sound source 144. Some embodiments may implement the computerized automatic test tool 160 as a general purpose or specific purpose computer system with programming to perform the testing processes described herein. Other embodiments may utilize one or more modular devices to perform different portions of the processes described herein, where the various modules are interconnected and operate together as a computerized apparatus that performs the testing processes together as a single effective entity with regard to the receiver side 102 and transmitter side 132 test equipment 110, 116, 118, 140, 144. For instance, the embodiment described in the disclosure with respect to FIG. 2 below implements the computerized automatic test tool 160 as a Field Programmable Gate Array (FPGA) based device that interconnects to the receiver side 102 and transmitter side 132 test equipment 110, 116, 118, 140, 144 to handle the particular commands and measurements of the automated testing with a link (a USB link for FIG. 2) from the FPGA to a computer running User Interface (UI) and/or result storage/analysis software. Thus, for the embodiment of FIG. 2, the FPGA and the computer together make up the computerized automatic test tool.

Once an embodiment is connected/set up as shown in FIG. 1 and as described in more detail above, an embodiment may automatically self-calibrate to establish the light and sound threshold levels for the sensed light signal 128 and receiver audio signal 118/sensed receiver audio signal 122 that indicate a transition from on-to-off and/or off-to-on for the test light 150 and test sound 156 reproduced on the receiver side 102 video display 114. Automatic calibration may be performed at any time during the testing process to ensure that light and sound threshold levels are set appropriately, but, most commonly the automatic calibration will occur at the beginning of a testing cycle to establish the baseline threshold levels. To ensure that light and/or sound background noise (or other factors such as dimming of the light source, quieting of the sound source, etc.) do not cause improper test readings, the system may be configured to perform additional automatic calibrations at a desired period, where the period may be measured as a specified period of time or as a specified number of test cycles.

To perform the automatic calibration of the light and sound threshold levels, the computerized automatic test tool 160 may instruct the transmitter side 132 light source 140 and sound source 144 to turn on. After waiting a sufficient period of time (e.g., a second or two, which is significantly more than the desired 240 ms delay to be measured) to ensure that the test light 150 and test sound 156 are reproduced at the AV receiver device 104, the computerized automatic test tool 160 may read the receiver side 102 light sensor 116 and audio signal (as either received audio signal 118 or sensed receiver audio signal 122, whichever option is chosen during the test system setup) to obtain ON values for the light sensor 116 and audio signal 118, 122. The computerized automatic test tool 160 may then turn off the transmitter side 132 light source 140 and sound source 144, and wait a sufficient time to ensure that the "off" state of the transmitter side 132 light source 140 and sound source 144 is reproduced by the AV receiver device 104. The computerized automatic test tool 160 may read the receiver side 102 light sensor 116 and audio signal (as either received audio signal 118 or sensed receiver audio signal 122, whichever option is chosen during the test system setup) to obtain OFF value readings for the receiver side 102 that take into account the ambient light and sound (i.e., background light and sound noise) at the receiver side 102. The computerized automatic test tool 160 may then set threshold levels for the light (T-Light) and sound (T-Audio) based on the ON and OFF readings for the light sensor 116 and audio signal 118, 122. Various statistical methods and/or algorithms may be used to define the particular threshold T-Light and T-Audio values so long as the end result is a reasonable approximation of a light/sound level that indicates a transition from OFF to ON or from ON to OFF for the reproduced test light 150 and test sound 156. One statistical calculation that provides a reasonable threshold value is to calculate the threshold values as the statistical mean value of the ON reading and the OFF reading. Thus, the transition level is substantially half way between the ON and the OFF reading. Once the threshold values are calculated, the computerized automatic test tool 160 may utilize the threshold values to determine change in state of the test light 150 and test sound 156 reproduced by the AV receiver device 104. For instance, when the sensed light signal 128 starts at an OFF value and then transitions past the T-Light level, it may be determined that the test light 150 reproduced on the receiver side 102 video display 114 has turned ON. Likewise, when the sensed light signal 128 starts at an ON value and then transitions past the T-Light level, it may be determined that the test light 150 reproduced on the receiver side 102 video display 114 has turned OFF. The T-Audio threshold may be used in a similar fashion for the ON and OFF states of the test sound 156 reproduced in the receiver side audio signals 118, 122. Other embodiments may reverse the order of the calibration ON and OFF readings without any substantial change in the calculated threshold level values.

Once the testing hardware is setup (e.g., like the system shown in FIG. 1), AV testing operations may be started. While it is typically desirable to calibrate the testing apparatus prior to beginning testing operations, it is not absolutely necessary. For instance, a computerized automatic test tool 160 may use predetermined threshold values that a system designer has determined to adequately reflect the threshold value such that calibration is not needed. Without the automatic calibration, a system with ambient light/sound noise on the receiver side 102 may not properly work if the predetermined values anticipated a substantially noiseless environment. To begin a testing operation/testing cycle to obtain a test value/sample, the computerized automatic test tool sends a synchronized test light signal 152 and test audio signal 158 to the transmitter side 132 light source 140 and sound source/speaker 144 at a test start time. The most basic and easiest to handle synchronization is to turn on both the light source 140 and sound source 144 at the same time. However, one skilled in the art will recognize that synchronization does not require that the light source 140 and sound source 144 be turned on simultaneously, only that the synchronization time difference between the test light signal and the test audio signal be known so that any time difference may be calculated out of the test measurement results. The computerized automatic test tool 160 may continuously read the receiver side 102 sensed light signal 128 to detect a received video time when the video display 114 of the AV receiver device 106 displays the test light 150 captured by the AV transmitter device 134. The computerized automatic test tool 160 may also continuously read the receiver side 102 receiver audio signal 118 or sensed receiver audio signal 122 (whichever setup option was selected) to detect a received audio time when the test sound 156 has been reproduced at the AV receiver device 104. The time measurements may be obtained using the standard system timestamp operations of the computer element(s) of the computerized automatic test tool 160. However, for many typical computer systems, the standard system timestamp does not perform fast enough to provide the accuracy and consistency necessary for acceptable test operation. Therefore, it may be preferable to measure the time periods as a function of the number of clock cycles of the system clock so as to eliminate any overhead involved in the time stamping operations of a computer. Further, it may also be desirable to move the clock operations off of the computer running the User Interface (UI) and supervisory test management software to eliminate any measurement issues that may be introduced by Central Processor Unit (CPU) or other computer system loading. When calculating times based on the system clock, one skilled in the art will recognize that the test start time may be given a zero (0) clock cycles value so that the received video time and the received audio time reflect the number of clock cycles since the test start time without the need to perform a subtraction operation to subtract out the zero test start time value. One skilled in the art will recognize that an embodiment that does not synchronize the test light signal 152 and test audio signal 158 as being transmitted substantially simultaneously will require additional calculations to account for the known synchronization difference between the test signals 152, 158.

The computerized automatic test tool 160 may calculate one or more AV latency times based on determined test start time, received video time, and received audio time. Three AV latency times that may be calculated include a video delay time, an audio delay time, and/or an AV-sync delay time. The video delay time may be calculated as the time between the test start time and the received video time. The audio delay time may be calculated as the time between the test start time and the received audio time. The AV-sync delay time may be calculated as the difference between the already calculated video delay time and audio delay time. One skilled in the art will note that if the synchronization between the test light signal 152 and the test audio signal 158 is not to send the signals 152, 158 substantially simultaneously, then the calculation of the AV latency times will need to take into account the known synchronization time differences in the transmittal of the test light signal 152 and the test audio signal 158.

If only one test cycle/sample is desired, the computerized automatic test system may report the AV latency test measurements and cease operation. However, typical testing of real-time systems of the nature of the video conferencing/video chatting may benefit from repeating the testing for a desired period of time or test cycles/samples (or simply repeat until told to stop) so as to obtain a continuous stream of test measurements over a period of time. To repeat the test operation, the computerized automatic test tool must first turn off the test light 150 and test sound 156 so that the test light 150 and test sound may be turned back on to measure the latency delays. To provide additional testing, embodiments may also measure the latency delays of the system turning off the test light 150 and test sound 156 using the same T-Light and T-Audio threshold values to determine the ON and OFF transitions of the test light 140 and test sound 144. The computerized automatic test tool 160 may record the latency/delay test measurements for each test cycle/sample in a log file for later use by a tester to analyze the operation of the AV transmitter device 134 and the AV receiver device 104. The log file may be any type of computer readable file, but a typical log file may be implemented as a Comma Separated Variable (CSV) file with different sample values recorded in a single record with variables separated by commas. Other information about the sample may also be recorded with the latency/delay test results, including a timestamp reflecting the time the data was recorded, the T-Audio and/or T-Light threshold values used for the test cycle/sample, or other data that may be useful for operational analysis. One skilled in the art will recognize that file types other than CSV files may be used to record data, including database records, tab separated variable files, binary record files, etc. The CSV file has the benefit that many data analysis software applications, such as Microsoft Excel, are capable of directly importing the data in a CSV file without the need for any additional import software.

In addition to calculating and recording the latency/delay test results, the computerized automatic test tool 160 may monitor the calculated latency/delay test results for problems. A tester/user may enter alarm limits (i.e., specify an acceptable value window) and the computerized automatic test tool 160 may report problems (i.e., issue an alarm) if the monitored latency/delay test results fall outside of the specified acceptable value window. Additionally, or alternatively, the computerized automatic test tool 160 may stop testing operations if the latency/delay test results fall outside of an acceptable value window. Multiple levels of alarms may be implemented such that different alarms are issued for minor deviations versus major deviations and the termination of testing operations may be performed for only the most severe deviation window.

Figure 2:
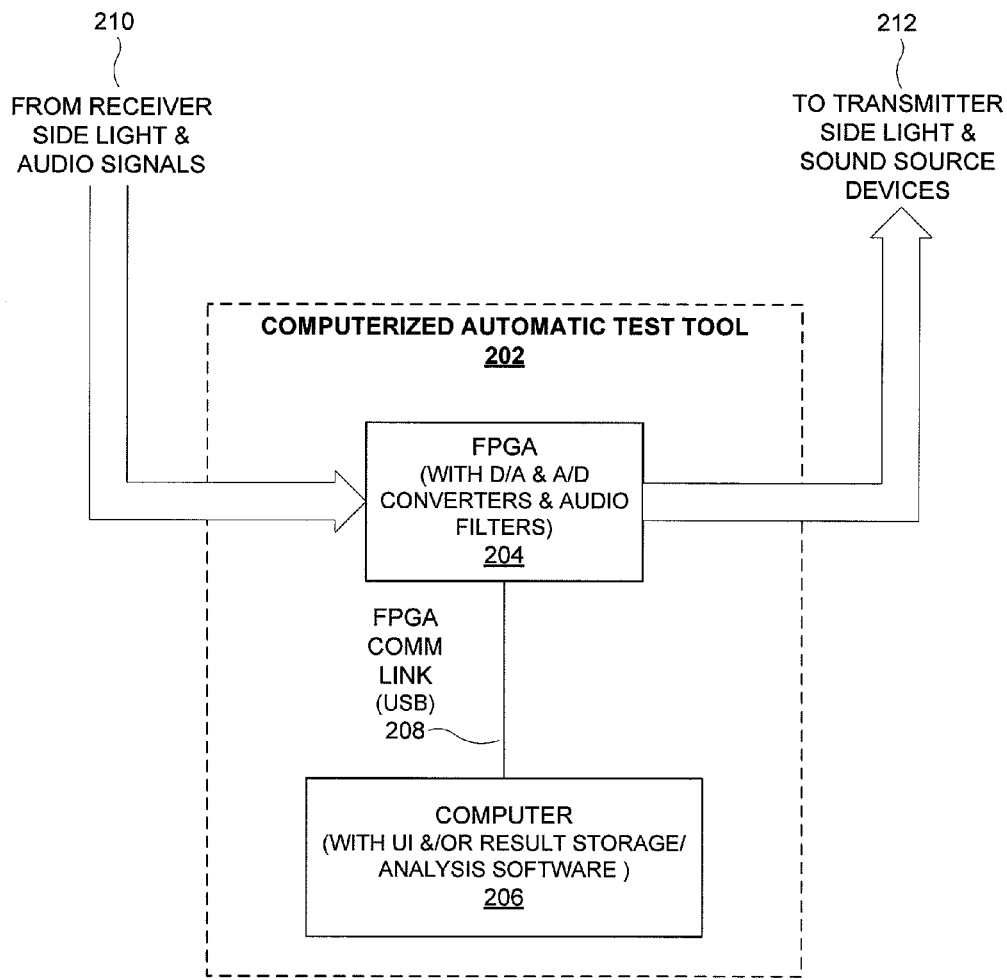
FIG. 2 is a block diagram of a combined Field Programmable Gate Array (FPGA) and computer embodiment of a glass-to-glass computerized automatic test tool.

FIG. 2 is a block diagram 200 of a combined Field Programmable Gate Array (FPGA) 204 and computer 206 embodiment of a glass-to-glass computerized automatic test tool 202. For the embodiment shown in FIG. 2, the FPGA 204 transmits/triggers the transmitter side light and sound stimulus sources 212, collects information from the receiver side sensors 210, and provides basic filtering and timing functions, including a local FPGA clock for determining the clock cycles of test latency/delay measurements. The FPGA 204 may be connected to a computer 206 using an FPGA communication link 208. An embodiment may implement the FPGA communication link 208 using a standard USB connection, but other communication link protocols/connections may be used as well. The computer 206 of the computerized automatic test tool 202 in the embodiment shown in FIG. 2 may run one or more software applications that provide supervisory control of the FPGA 204, continuously collect and log measurements, perform monitoring and alarming functions, and/or provide a user interface for management and configuration of the operational testing processes. Separating the critical timing aspects of the testing into the FPGA makes the timing independent of the computer CPU and other system loading so the testing operations will not be disturbed by other applications running on the same computer.

FIGS. 3-8 are flow charts that describe processes in the setup, calibration and performance of the automatic glass-to-glass testing by a testing apparatus (i.e., the computerized automatic test tool and attached light/sound sensors and stimuli sources) of an AV test system (i.e., the AV transmitter and receiver devices). The processes described as being performed by the computerized automatic test tool may be performed by subsystems of the computerized automatic test tool, including functions and features of subsystems of software running on a computer controlled logic device as well as separating out functionality between separate physical computer modules such as the FPGA and computer described above in the disclosure with respect to FIG. 2.

Figure 3:
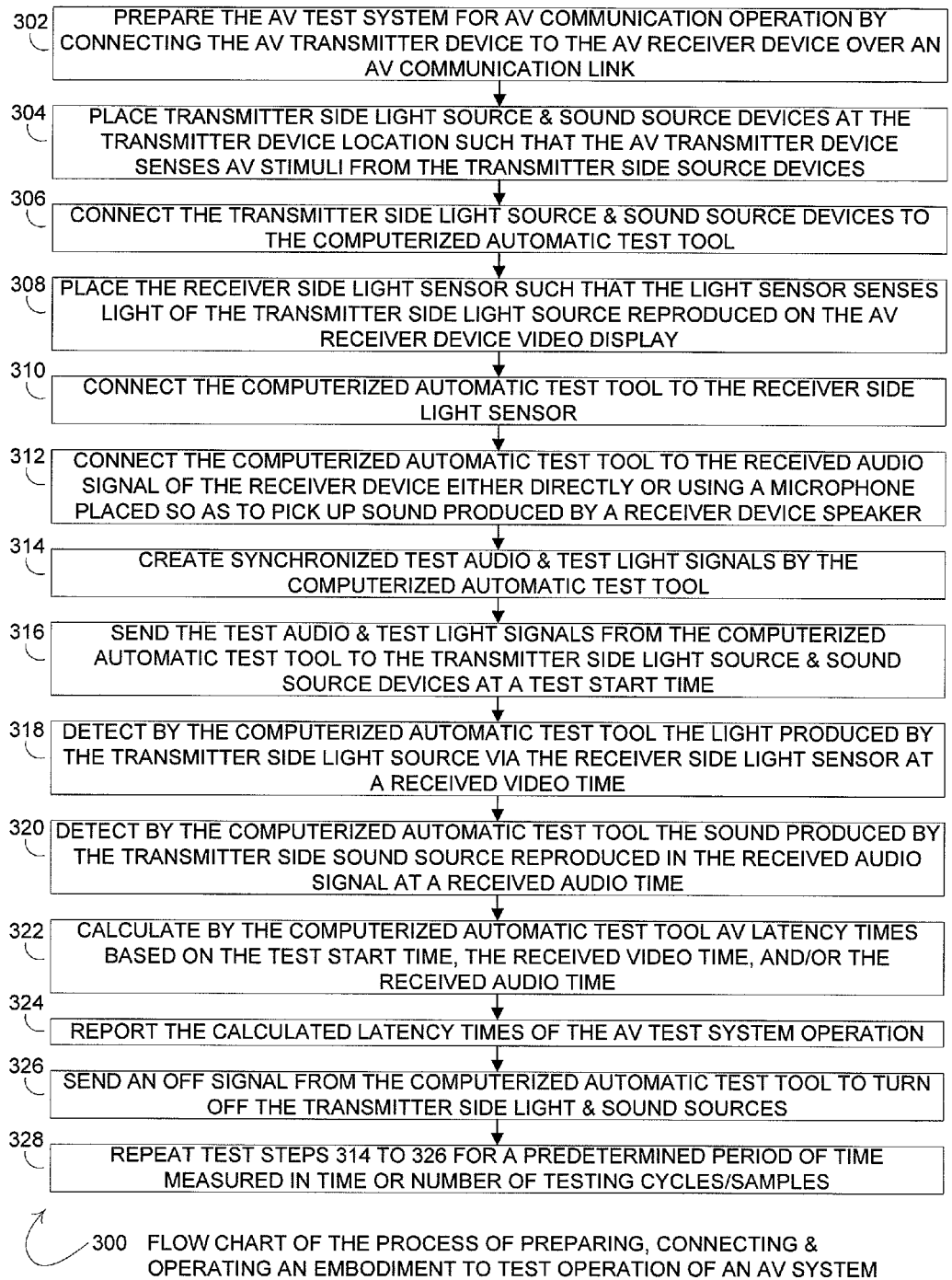
FIG. 3 is a flow chart of the processes for preparing, connecting, and operating an embodiment to perform glass-to-glass operational testing of AV latency on AV devices under test.

FIG. 3 is a flow chart 300 of the processes for preparing, connecting, and operating an embodiment to perform glass-to-glass operational testing of AV latency on AV devices under test. At process 302, the AV test system (i.e., the system under test) is prepared for AV communication operation by connecting the AV transmitter device to the AV receiver device over an AV communication link. At process 304, light source and sound source devices that provide AV stimuli are placed at the transmitter location in such a manner that the AV transmitter device senses the stimuli produced by the light source and sound source devices. At process 306, the light source and sound source placed at the transmitter location are connected to the computerized automatic test tool. At process 308, the receiver side light sensor is placed so that the light sensor senses the light of the transmitter side light source reproduced on the AV receiver device video display. The light sensor may be placed directly on the video display over the location on the video display that shows the transmitter side light source or the light sensor may be set up to target the location on the video display that shows the transmitter side light source without being placed directly on the video display, depending on how the light sensor is designed to operate. At process 310, the receiver side light sensor is connected to the computerized automatic test tool. At process 312, the computerized automatic test tool is connected to a received audio signal of the AV receiver device. The connection to the received audio signal may be made directly to an audio output of the AV receiver device (typically provided to connect to head phones or an external speaker) or the received audio signal may be sensed by a receiver side microphone/audio sensor placed such the receiver side microphone/audio sensor senses the sound made by a speaker driven by the receiver side audio signal. At process 312, synchronized test audio and test light signals are created by the computerized automatic test tool. The typical synchronization is to turn on the test audio and test light signals substantially simultaneously. Other synchronization schemes may be utilized, but will require additional arithmetic to account for the different synchronization of the test audio and light signals when calculating test delay/latency results. At process 314, the computerized automatic test tool sends the test audio and test light signals to the transmitter side sound and light stimulus sources at a test start time. At process 318, the computerized automatic test tool detects the light produced by the transmitter side light source via the receiver side light sensor at a received video time. At process 320, the computerized automatic test tool detects the sound produced by the transmitter side sound source reproduced in the received audio signal at a received audio time. At process 322, the computerized automatic test tool calculates one or more AV latency/delay times (such as a video delay time, an audio delay time, and/or an AV-sync delay time) based on the test start time, the received video time, and the received audio time. At process 324, the computerized automatic test tool reports the calculated latency times of the AV test system operation. The reporting of the latency times by the computerized automatic test tool may be through the user interface of the computerized automatic test tool and/or by recording the latency/delay test values in a log file. At process 326, the computerized automatic test tool sends an OFF signal to the transmitter side light source and sound source devices to turn off the test AV stimuli. At process 328, processes 314 to 326 are repeated for a predetermined period of time measured in time or number of testing cycles/samples. Alternatively, testing may be repeated until a tester/user commands the computerized automatic test system to stop performing test operations.

Figure 4:
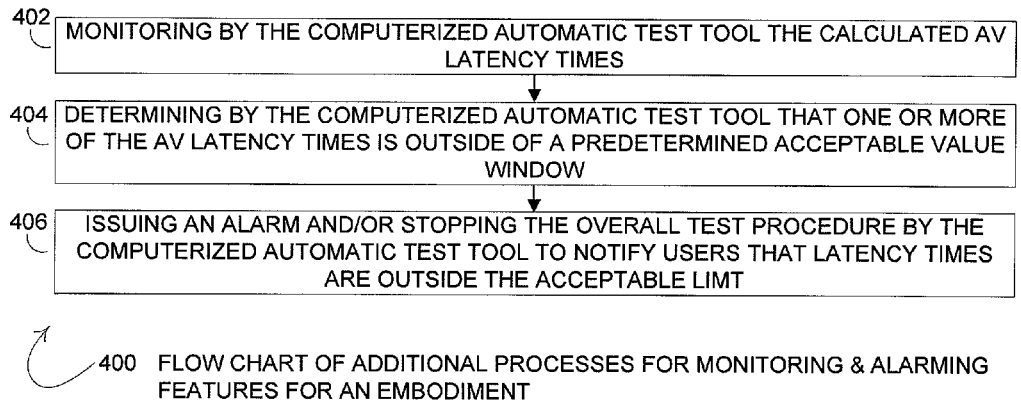
FIG. 4 is a flow chart of additional processes for monitoring and alarming features of an embodiment.

FIG. 4 is a flow chart 400 of additional processes for monitoring and alarming features of an embodiment. At process 402, the computerized automatic test tool monitors the calculated AV latency/delay times. At process 404, the computerized automatic test tool determines that one or more of the calculated AV latency/delay times is outside of a predetermined acceptable value window. At process 406, the computerized automatic test tool issues an alarm and/or stops testing operations to notify testers/users that there are irregular test results and/or to stop further testing when irregular test results are encountered.

Figure 5:
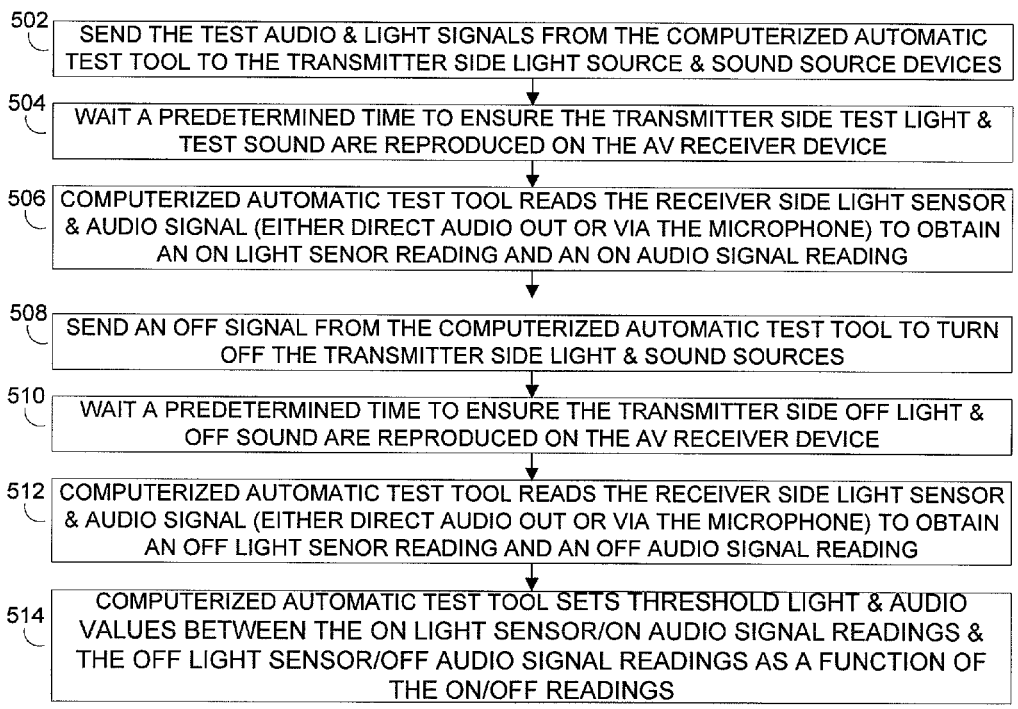
FIG. 5 is a flow chart of additional processes for automatically calibrating an embodiment.

FIG. 5 is a flow chart 500 of additional processes for automatically calibrating an embodiment. Calibration may occur at any time during operation and is typically performed at least at system startup. It may also be desirable to perform the calibration processes at predetermined intervals to ensure that the test apparatus is properly, and automatically, re-calibrated. At process 502, the test audio and light signals are sent from the computerized automatic test tool to the transmitter side light and sound stimuli source devices. At process 504, the computerized automatic test tool waits a predetermined time (e.g., one to two seconds) to ensure that the transmitter side test light and test sound are being reproduced on the AV receiver device. At process 506, the computerized automatic test tool reads the receiver side light sensor and audio signal (either via the direct audio output of the AV receiver device or via the microphone sensing sounds made by the AV receiver device speaker) to obtain an ON light sensor reading and an ON audio signal reading. At process 508, OFF audio and OFF light signals are sent from the computerized automatic test tool to the transmitter side light and sound stimuli source devices. At process 510, the computerized automatic test tool waits a predetermined time (e.g., one to two seconds) to ensure that the transmitter side OFF light and OFF sound are being reproduced on the AV receiver device. At process 512, the computerized automatic test tool reads the receiver side light sensor and audio signal (either via the direct audio output of the AV receiver device or via the microphone sensing sounds made by the AV receiver device speaker) to obtain an OFF light sensor reading and an OFF audio signal reading. At process 514, the computerized automatic test tool calculates and sets threshold light (i.e., T-Light) and audio (i.e., T-Audio) values as a value between the ON and OFF receiver side light sensor/audio signal readings as a function of the ON/OFF readings. An embodiment may use the mean of the ON/OFF readings for T-Light and T-Audio. The threshold values may then be used by the computerized automatic test tool to determine when a change of state from ON to OFF or OFF to ON has occurred for the receiver side light sensor/audio signal.

Figure 6:
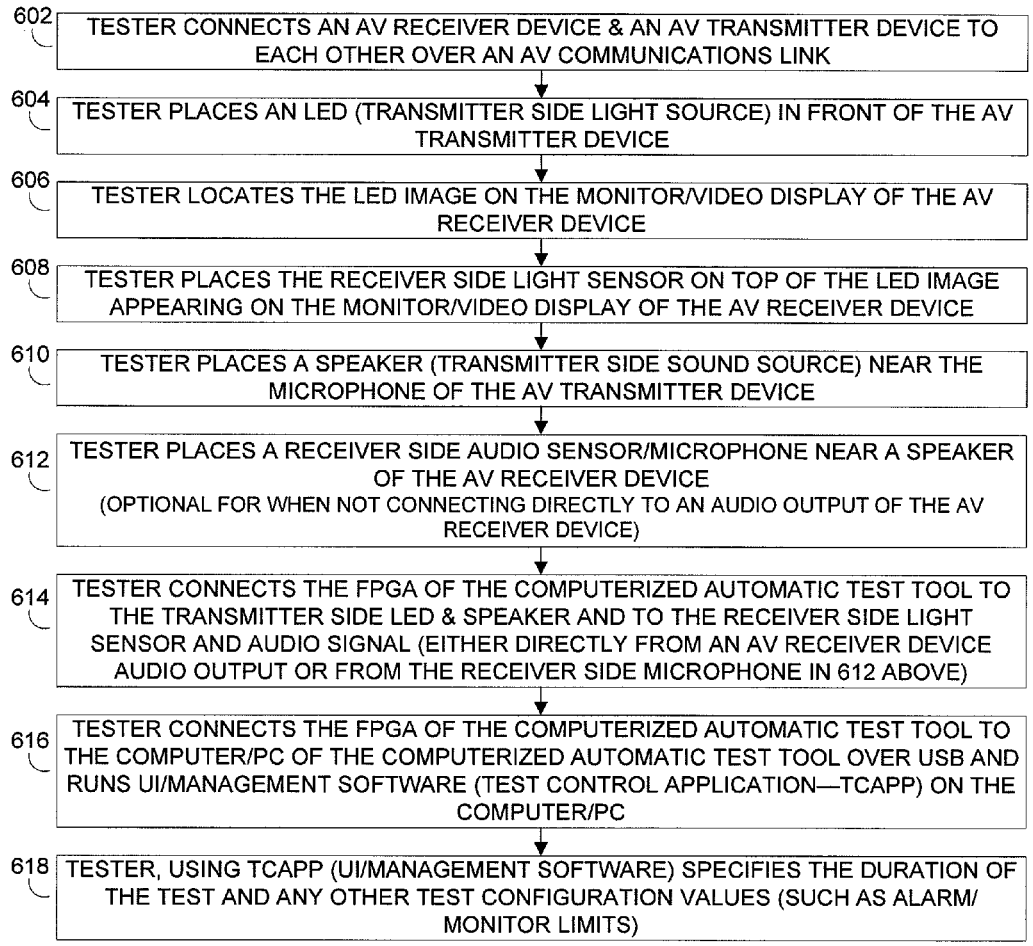
FIG. 6 is a flow chart of the processes for setting up testing operations for a particular embodiment having an FPGA and a computer running TCapp (Test Control application) User Interface (UI)/test management software.
Figure 7:
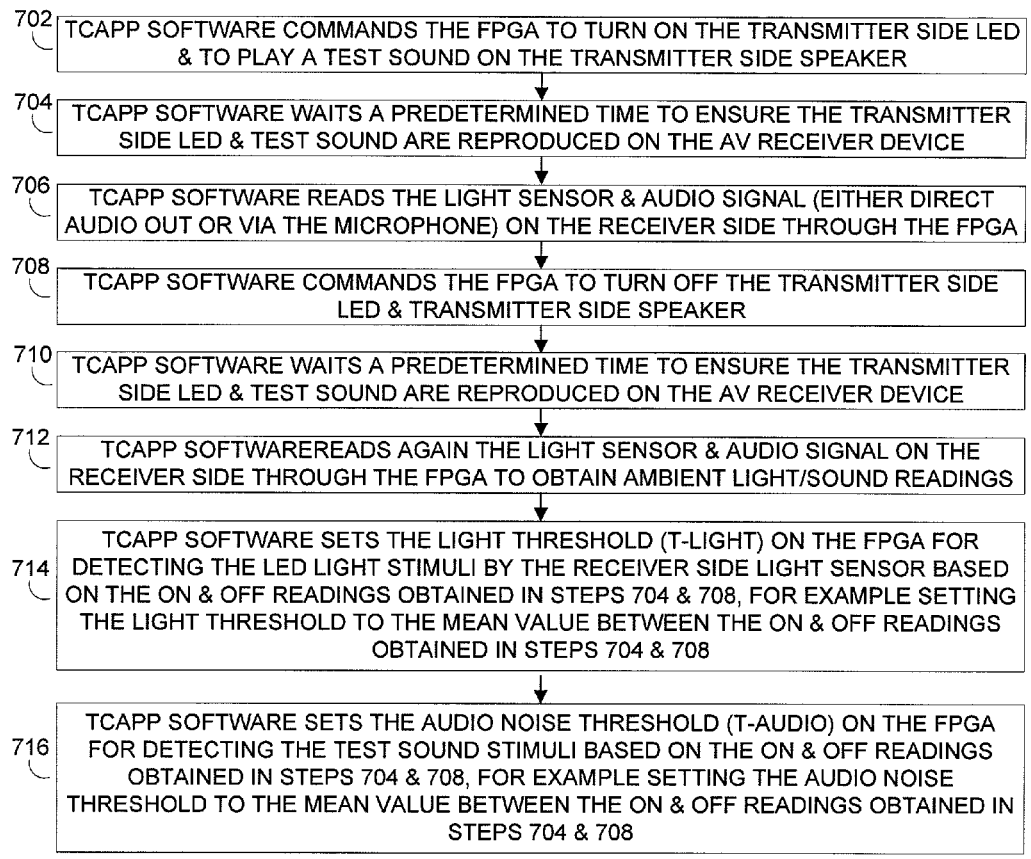
FIG. 7 is a flow chart of the processes for automatic calibration for a particular embodiment having an FPGA and a computer running TCapp UI/test management software.
Figure 8:
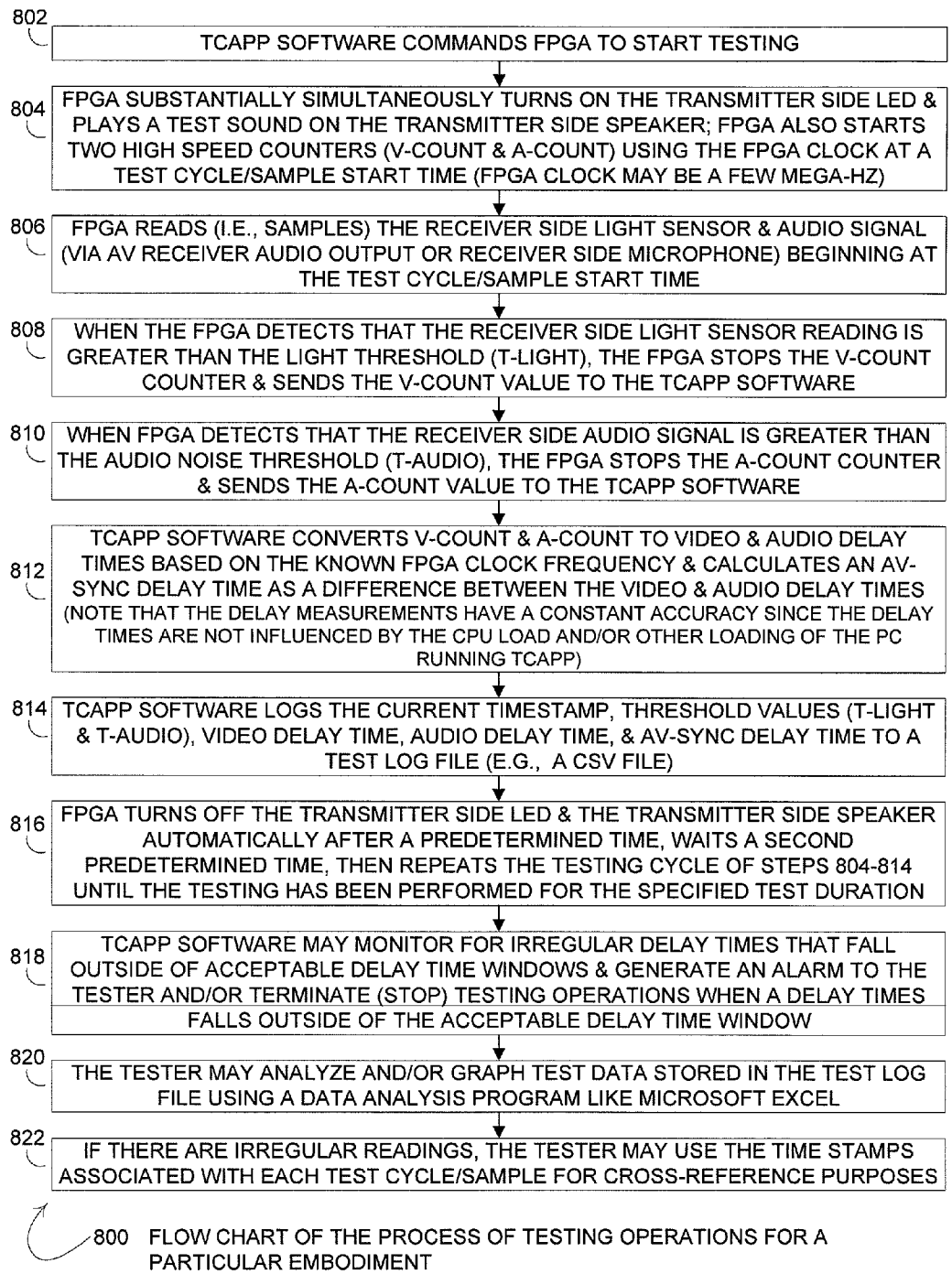
FIG. 8 is a flow chart of the processes for glass-to-glass AV latency testing for a particular embodiment having an FPGA and a computer running TCapp UI/test management software.

FIGS. 6-8 describe processes for a particular embodiment where the computerized automatic test tool is comprised of an FPGA and a computer running Test Control Application (TCapp) software. The particular embodiment may utilize the FPGA board for handling triggering (i.e., sending on/off signals to) the transmitter side light/audio stimulus sources, collecting information from the receiver side light sensor and audio signal, and providing basic filtering and timing functions. The computer (such as a Personal Computer—PC) provides a user interface and supervisory control of the FPGA, continuously collects and logs test measurements delivered from the FPGA, and may provide alarm monitoring through the TCapp software running on the computer.

FIG. 6 is a flow chart 600 of the processes for setting up testing operations for the particular embodiment having an FPGA and a computer running TCapp (Test Control application) User Interface (UI)/test management software. At process 602, a tester connects an AV receiver device and an AV transmitter device to each other over an AV communication link. At process 504, the tester places an LED (i.e., transmitter side light stimulus source) in front of the AV transmitter device. At process 606, the tester locates the LED image on the monitor/video display of the AV receiver device. At process 608, the tester places the receiver side light sensor on top of the LED image appearing on the monitor/video display of the AV receiver device. At process 610, the tester places a speaker (i.e., transmitter side sound stimulus source) near the microphone (i.e., audio capture sensor) of the AV transmitter device. At process 612, the tester places a receiver side audio sensor/microphone near a speaker of the AV receiver device. Process 612 is optional and need not be performed if the computerized automatic test tool is going to be connected directly to the audio out (i.e., head phone jack) of the AV receiver device. At process 614, the tester connects the FPGA of the computerized automatic test tool to the transmitter side LED and speaker AV stimuli sources and to the receiver side light sensor and audio signal. The receiver side audio signal is either the direct audio output of the AV receiver device, or the output from a receiver side microphone sensing sound from the AV receiver device. At process 616, the tester connects the FPGA of the computerized automatic test tool to the computer/PC of the computerized automatic test tool over a USB connection and runs the TCapp user interface/test management software on the computer/PC of the computerized automatic test tool. At process 618, the tester, using the TCapp software, may specify the duration of the test and/or other test configuration values, such as alarm/monitor limits.

FIG. 7 is a flow chart 700 of the processes for automatic calibration for a particular embodiment having an FPGA and a computer running TCapp UI/test management software. At process 702, the TCapp software commands the FPGA to turn ON the transmitter side LED and to play a test sound on the transmitter side speaker. At process 704, the TCapp software waits a predetermined period of time to ensure that the transmitter side LED and test sound are reproduced on the AV receiver device. At process 706, the TCapp software reads the receiver side light sensor and audio signal (either via the direct connection to the AV receiver device audio output or via a microphone sensing the AV receiver device speaker sound) to obtain ON AV readings. At process 708, the TCapp software commands the FPGA to turn OFF the transmitter side LED and the transmitter side speaker. At process 710, the TCapp software waits a predetermined period of time to ensure that the transmitter side LED and speaker OFF states are reproduced on the AV receiver device. At process 712, the TCapp software reads the receiver side light sensor and audio signal (either via the direct connection to the AV receiver device audio output or via a microphone sensing the AV receiver device speaker sound) to obtain OFF AV readings. At process 714, the TCapp software sets the light threshold (T-Light) on the FPGA for detecting the LED light stimuli by the receiver side light sensor based on the ON and OFF readings obtained in processes 706 and 712. For example, an embodiment may set the light threshold T-Light to the mean valued between the ON and OFF readings from processes 706 and 712. At process 716, the TCapp software sets the audio threshold (T-Audio) on the FPGA for detecting the test sound stimuli by the receiver side audio signal based on the ON and OFF readings obtained in processes 706 and 712. For example, an embodiment may set the audio threshold T-Audio to the mean valued between the ON and OFF readings from processes 706 and 712.

FIG. 8 is a flow chart 800 of the processes for glass-to-glass AV latency testing for a particular embodiment having an FPGA and a computer running TCapp UI/test management software. At process 802, the TCapp software commands the FPGA to start testing. At process 804, the FPGA substantially simultaneously turns ON the transmitter side LED and plays a test sound on the transmitter side speaker. Concurrently, the FPGA starts two high speed counters (V-Count and A-Count) using the FPGA clock at a test cycle/sample start time. The FPGA clock may be in the one to a few MHz (mega-hertz) range. At process 806, the FPGA reads (i.e., samples) the receiver side light sensor and audio signal (either via the direct connection to the AV receiver device audio output or via a microphone sensing the AV receiver device speaker sound) beginning at the test cycle/sample start time. At process 808, when the FPGA detects that the receiver side light sensor reading is greater than the light threshold (T-Light), the FPGA stops the V-Count counter and sends the V-Count value to the TCapp software. At process 810, when the FPGA detects that the receiver side audio signal reading is greater than the audio threshold (T-Audio), the FPGA stops the A-Count counter and sends the A-Count value to the TCapp software. At process 812, the TCapp software converts the V-Count and A-Count values to video and audio delay times based on the known FPGA clock frequency, and also calculates an AV-Sync delay time as a difference between the video and audio delay times. It is notable that the delay measurements have a constant accuracy since the delay times are not influenced by the CPU load and/or other loading of the computer/PC running the TCapp software because the timing measurements are performed by the FPGA. At process 814, the TCapp software logs the current timestamp, threshold values (T-Light and T-Audio), video delay time, audio delay time, and AV-sync delay time to a test log file. The test log file may be a CSV file for ease of creation and/or for ease of use by analysis software such as Microsoft Excel. At process 816, the FPGA turns OFF the transmitter side LED and the transmitter side speaker automatically after a predetermined time, waits a second predetermined time, then repeats the testing cycle of processes 804-814 until the testing has been performed for the specified test duration. At process 818, the TCapp software may monitor for irregular delay times that fall outside of acceptable delay time windows and generates an alarm to the tester and/or terminates (i.e., stops) testing operations when one or more delay times fall outside of the acceptable delay window. At process 820, the tester may analyze and/or graph test data stored in the test log file using data analysis software, such as Microsoft Excel. At process 822, if there are irregular readings, the tester may use the time stamps associated with the irregular readings for each test cycle/sample from the test log file to cross reference data from any operational logs of the AV receiver device and/or the AV transmitter device.

The various embodiments provide the basis for a simple, low cost video and audio "glass-to-glass" latency/delay test measurement apparatus. The test apparatus may include automatic calibration, and also permit automatic, continuous measurement of video and audio delay characteristics. The various embodiments may be integrated into an automatic testing framework, allowing quality assurance procedures to be automatically applied throughout the entire product development cycle. The continuous measurement mode allows for the opportunity to debug transmit and receive communication path implementations in a variety of scenarios, such as when activating mid-call features (bring in a third party, etc.), or exercising additional device features during the continuous delay measurement test. The various embodiments provide a test apparatus that provides an integrated, accurate, AV synchronization measurement that may prove crucial for creating quality video conferencing equipment and experiences.

Various embodiments may provide the control and management functions detailed herein via an application operating on a computer system (or other electronic devices). Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method to automatically perform glass-to-glass operational testing of a test Audio/Video (AV) system comprising:

preparing said test AV system for AV communication operation by operably connecting an AV transmitter device located at a transmitter location to an AV receiver device located at a receiver location over an AV communication link such that said AV transmitter device detects AV stimuli data, converts said AV stimuli data to an appropriate communication format and transmits said AV stimuli detected at said transmitter location over said AV communication link to said AV receiver device that converts said AV stimuli data in said appropriate communication format received from said AV communication link to received audio and received video signals for playback on audio and video devices operably connected to said AV receiver device;

operably connecting a Field Programmable Gate Array (FGPA) to a computer running test management software via an FPGA communication link in order to create a computerized automatic test tool, said computer running said test management software providing a user interface and data storage for managing and monitoring said glass-to-glass operational testing, and said FPGA having an FPGA local clock for operation of critical time aspects of said computerized automatic test tool such that said FPGA operation is independent of said computer operation ensuring that time critical aspects of said computerized automatic test tool are independent of and not disturbed by said test management software and/or other software running on said computer;

placing a transmitter side light source device and a transmitter side sound source device at said transmitter location such that a video sensor of said AV transmitter device detects light stimuli from said transmitter side light source device and a sound sensor of said AV transmitter device detects sound stimuli emitted by said transmitter side sound source device;

operably connecting said transmitter side light source device and said transmitter side sound source device at said transmitter location to said FPGA of said computerized automatic testing system;

placing a receiver side light sensor at said receiver location such that said receiver side light sensor detects the light emitted from said transmitter side light source device reproduced on a video display of said AV receiver device in accord with said received video signal;

operably connecting said FPGA of said computerized automatic testing system to said receiver side light sensor;

operably connecting said FPGA of said computerized automatic testing system to an audio output of said AV receiver device;

creating by said FPGA of said computerized automatic test tool a test audio signal and a test light signal such that said test audio signal and said test light signal are synchronized to each other;

sending said test audio signal and said test light signal from said FPGA of said computerized automatic test tool to said transmitter side sound source device and said transmitter side light source device at a test start time such that said transmitter side sound sensor device and said transmitter side video sensor device detect synchronized AV stimuli and transmit said synchronized AV stimuli data to said AV receiver device;

detecting by said FPGA of said computerized automatic test tool through said operably connected receiver side light sensor light produced by said transmitter side light source device reproduced on said video display of said AV receiver device in accord with said received video signal at a received video time;

detecting by said FPGA of said computerized automatic test tool sound produced by said transmitter side sound source device reproduced in said received audio signal at a received audio time;

calculating by said FPGA of said computerized automatic test tool at least one AV latency time based on said test start time, said detected received video time, and/or said detected received audio time by counting clock cycles of said FPGA local clock of said FPGA of said computerized automatic test tool between test start, detect video receive, and/or detect audio receive events such that said counting of said clocks cycles of said FPGA local clock is not influenced by loading on a Central Processing Unit (CPU) of said computer;

delivering said at least one AV latency time determined by said FPGA of said computerized automatic test tool to said computer running said test management software over said FPGA communication link; and reporting by said computer running said test management software of said computerized automatic test tool said at least one AV latency time as a metric of said AV test system operation.

2. The method of claim 1 further comprising:

sending an OFF signal from said computerized automatic test tool to turn OFF said transmitter side sound source device and said transmitter side light source device; and repeating said processes of creating said test audio signal and said test light signal, transmitting said test audio signal and said test light signal to said transmitter side sound source device and said transmitter side light source device, detecting said light produced by said transmitter side light source device reproduced on said video display of said AV receiver device, detecting sound produced by said transmitter side sound source device reproduced in said received audio signal, calculating said at least one AV latency time, reporting said at least one AV latency time performed, and sending said OFF signal to said transmitter side sound source device and said transmitter side light source device by said computerized automatic test tool automatically for a predetermined period of time.

3. The method of claim 1 further comprising automatically calibrating operation of said computerized automatic test tool, said process of automatically calibrating operation of said computerized automatic test tool further comprising:

sending from said computerized automatic test tool said test audio signal and said test light signal to said transmitter side sound source device and said transmitter side light source device;

waiting by said computerized automatic test tool a predetermined period of time to ensure that said test audio signal and said test light signal is reproduced by said AV receiver device;

reading by said computerized automatic test tool said receiver side light sensor and said receiver side audio signal to obtain an ON light sensor reading and an ON audio signal reading;

sending an OFF signal from said computerized automatic test tool to turn off said transmitter side sound source device and said transmitter side light source device;

waiting by said computerized automatic test tool a predetermined period of time to ensure that said OFF audio signal and said OFF light signal is reproduced by said AV receiver device;

reading by said computerized automatic test tool said receiver side light sensor and said receiver side audio signal to obtain an OFF light sensor reading and an OFF audio signal reading; and setting by said computerized automatic test tool threshold light and audio values between said ON light sensor/ON audio signal readings and said OFF light sensor/OFF audio signal readings as a function of said ON/OFF readings such that said threshold light and audio values delineate when said computerized automatic test system detects a change in state from OFF to ON and/or OFF to ON of said light and audio stimuli reproduced by said AV receiver device.

4. The method of claim 1 wherein said process of reporting by said computerized test system said at least one AV latency time as said metric of said AV test system operation further comprises recording said metric of said AV test system in a computer readable file for storage and analysis.

5. The method of claim 1 further comprising:
monitoring by said computerized automatic test tool said at least one AV latency time calculated by said computerized automatic test system;
determining by said computerized automatic test tool that said monitored at least one AV latency time is outside of a predetermined acceptable value window; and
issuing by said computerized automatic test tool an alarm to notify users that said at least one AV latency time is outside of a predetermined acceptable value window.

6. The method of claim 1 further comprising:
monitoring by said computerized automatic test tool said at least one AV latency time calculated by said computerized automatic test system;
determining by said computerized automatic test tool that said monitored at least one AV latency time is outside of a predetermined acceptable value window; and
stopping by said computerized automatic test tool said glass-to-glass operational testing of a test Audio/Video (AV) system method when said at least one AV latency time is outside of a predetermined acceptable value window.

7. The method of claim 1 wherein said at least one AV latency time is at least one of a group consisting of: a video delay time calculated as a time between said test start time and said received video time, an audio delay calculated as a time between said test start time and said received audio time, and an AV-sync delay time calculated as a time between said received video time and said received audio time.

8. The method of claim 1 further comprising placing a receiver side audio sensor at said receiver location such that said receiver side audio sensor detects sound emitted from said transmitter side sound source device reproduced by a speaker of said AV receiver device in accord with said received audio signal such that said process of detecting by said computerized automatic test tool sound produced by said transmitter side sound source device reproduced in said received audio signal at a received audio time is performed with regard to said received audio signal sensed by said receiver side audio sensor.

9. An AV test apparatus for automatically performing glass-to-glass operational testing of a test Audio/Video (AV) system, said test AV system comprising an AV transmitter device located at a transmitter location operably connected to an AV receiver device located at a receiver location over an AV communication link such that said AV transmitter device detects AV stimuli data, converts said AV stimuli data to an appropriate communication format and transmits said AV stimuli detected at said transmitter location over said AV communication link to said AV receiver device that converts said AV stimuli data in said appropriate communication format received from said AV communication link to received audio and received video signals for playback on audio and video devices operably connected to said AV receiver device, comprising:

a transmitter side light source device and a transmitter side sound source device placed at said transmitter location such that a video sensor of said AV transmitter device detects light stimuli from said transmitter side light source device and a sound sensor of said AV transmitter device detects sound stimuli emitted by said transmitter side sound source device;

a receiver side light sensor placed at said receiver location such that said receiver side light sensor detects the light emitted from said transmitter side light source device reproduced on a video display of said AV receiver device in accord with said received video signal; and a computerized automatic test tool that is further comprised of:
a computer that runs test management software that provides a user interface and data storage for managing and monitoring said glass-to-glass operational testing; and
a Field Programmable Gate Array (FGPA) operably connected to said computer running test management software via an FPGA communication link and further interconnected to said transmitter light and sound sources and to said receiver side video sensor and audio signal, said FPGA having an FPGA local clock for operation of critical time aspects of said computerized automatic test tool such that said FPGA operation is independent of said computer operation ensuring that time critical aspects of said computerized automatic test tool are independent of and not disturbed by said test management software and/or other software running on said computer;
said FPGA having said clock of said computerized automatic test tool for counting of said clock cycles ensuring said counting of said clocks cycles is not influenced by loading on a Central Processing Unit (CPU) of said computer; and wherein said FPGA of said computerized automatic test tool is operably connected to said transmitter side light source device and said transmitter side sound source device at said transmitter location, to said receiver side light sensor, and to an audio output of said AV receiver device, said FPGA of said computerized automatic test tool having subsystems that create a test audio signal and a test light signal such that said test audio signal and said test light signal are synchronized to each other, send said test audio signal and said test light signal from said FPGA of said computerized automatic test tool to said transmitter side sound source device and said transmitter side light source device at a test start time such that said transmitter side sound sensor device and said transmitter side video sensor device detect synchronized AV stimuli and transmit said synchronized AV stimuli data to said AV receiver device, detect by said FPGA of said computerized automatic test tool through said operably connected receiver side light sensor light produced by said transmitter side light source device reproduced on said video display of said AV receiver device in accord with said received video signal at a received video time, detect by said FPGA of said computerized automatic test tool sound produced by said transmitter side sound source device reproduced in said received audio signal at a received audio time, calculate by said FPGA of said computerized automatic test tool at least one AV latency time based on said test start time, said detected received video time, and/or said detected received audio time by counting clock cycles of said FPGA local clock of said FPGA of said computerized automatic test tool between test start, detect video receive, and/or detect audio receive events such that said counting of said clocks cycles of said FPGA local clock is not influenced by loading on a Central Processing Unit (CPU) of said computer, deliver said at least one AV latency time determined by said FPGA of said computerized automatic test tool to said computer running said test management software over said FPGA communication link, and report by said computer running said test management software said at least one AV latency time as a metric of said AV test system operation.

10. The AV test apparatus of claim 9 wherein said computerized automatic test tool is further comprised of subsystems that send an OFF signal from said computerized automatic test tool to turn OFF said transmitter side sound source device and said transmitter side light source device, and that repeat testing cycles automatically for a predetermined period of time.

11. The AV test apparatus of claim 9 wherein said computerized automatic test tool is further comprised of subsystems for automatically calibrating operation of said computerized automatic test tool said automatic calibration subsystems further comprising subsystems that send from said computerized automatic test tool said test audio signal and said test light signal to said transmitter side sound source device and said transmitter side light source device, wait a predetermined period of time to ensure that said test audio signal and said test light signal is reproduced by said AV receiver device, read said receiver side light sensor and said receiver side audio signal to obtain an ON light sensor reading and an ON audio signal reading, send an OFF signal from said computerized automatic test tool to turn off said transmitter side sound source device and said transmitter side light source device, wait a predetermined period of time to ensure that said OFF audio signal and said OFF light signal is reproduced by said AV receiver device, read said receiver side light sensor and said receiver side audio signal to obtain an OFF light sensor reading and an OFF audio signal reading, and setting threshold light and audio values between said ON light sensor/ON audio signal readings and said OFF light sensor/OFF audio signal readings as a function of said ON/OFF readings such that said threshold light and audio values delineate when said computerized automatic test system detects a change in state from OFF to ON and/or OFF to ON of said light and audio stimuli reproduced by said AV receiver device.

12. The AV test apparatus of claim 9 wherein said computerized automatic test tool is further comprised of subsystems that record said metric of said AV test system in a computer readable file for storage and analysis.

13. The AV test apparatus of claim 9 wherein said computerized automatic test tool is further comprised of subsystems that monitor said at least one AV latency time calculated by said computerized automatic test system, determine that said monitored at least one AV latency time is outside of a predetermined acceptable value window, and issue an alarm to notify users that said at least one AV latency time is outside of a predetermined acceptable value window.

14. The AV test apparatus of claim 9 wherein said computerized automatic test tool is further comprised of subsystems that monitor said at least one AV latency time calculated by said computerized automatic test system, determine that said monitored at least one AV latency time is outside of a predetermined acceptable value window, and stop said glass-to-glass operational testing of a test Audio/Video (AV) system when said at least one AV latency time is outside of a predetermined acceptable value window.

15. The AV test apparatus of claim 9 wherein said at least one AV latency time is at least one of a group consisting of: a video delay time calculated as a time between said test start time and said received video time, an audio delay calculated as a time between said test start time and said received audio time, and an AV-sync delay time calculated as a time between said received video time and said received audio time.

16. The AV test apparatus of claim 9 further comprising a receiver side audio sensor placed at said receiver location such that said receiver side audio sensor detects sound emitted from said transmitter side sound source device reproduced by a speaker of said AV receiver device in accord with said received audio signal such that said detection by said computerized automatic test tool sound produced by said transmitter side sound source device reproduced in said received audio signal at a received audio time is performed with regard to said received audio signal sensed by said receiver side audio sensor.

* * * * *